United States Patent [19]

Tamura et al.

[11] Patent Number: 5,072,251
[45] Date of Patent: Dec. 10, 1991

[54] BLUR DETECTING APPARATUS

[75] Inventors: Shuichi Tamura, Yokohama; Isao Nakazawa, Kawasaki, both of Japan

[73] Assignee: Canon Kabushiki Kaisha, Tokyo, Japan

[21] Appl. No.: 657,387

[22] Filed: Feb. 19, 1991

Related U.S. Application Data

[63] Continuation of Ser. No. 553,368, Jul. 17, 1990, abandoned, which is a continuation of Ser. No. 295,349, Jan. 10, 1989, abandoned.

[30] Foreign Application Priority Data

Jan. 12, 1988 [JP] Japan .................................. 63-4524

[51] Int. Cl.$^5$ .............................................. G03B 7/08
[52] U.S. Cl. ...................................... 354/430; 354/70
[58] Field of Search .................................. 354/430, 70

[56] References Cited

U.S. PATENT DOCUMENTS 3,711,178  1/1973  Humphrey ........................... 350/16
4,996,545  2/1991  Enomoto et al. ..................... 354/70

FOREIGN PATENT DOCUMENTS 0055429  12/1979  Japan ................................. 354/430

Primary Examiner—Russell E. Adams
Attorney, Agent, or Firm—Fitzpatrick, Cella, Harper & Scinto

[57] ABSTRACT

A blur detecting apparatus is provided with a light projecting means for projecting a signal light, light receiving means for receiving the signal light projected from the light projecting means and detecting the received position of the signal light, guide means for guiding the signal light projected from the light projecting means to the light receiving means, and varying means for varying the guiding action of the guiding means in conformity with blur and varying the received position of the signal light received by the light receiving means and in which the blur state is detected from the received position of the signal light detected by the light receiving means.

122 Claims, 3 Drawing Sheets

BLUR DETECTING APPARATUS

This application is a continuation of application Ser. No. 553,368, filed on July 17, 1990, which is a continuation of application Ser. No. 295,349, filed on Jan. 10, 1989, both applications now abandoned.

BACKGROUND OF THE INVENTION

1. Field of the Invention

This invention relates to a blur detecting apparatus used to detect, for example, the amount of camera-shake.

2. Related Background Art

An apparatus using the rotational angular speed detecting method by a rate gyro, a vibration gyro or the like, is well known as in apparatus for detecting camera blur resulting from camera-shake.

However, in such a blur detecting apparatus using the rotational angular speed detecting method, a circuit, or the like, for driving the gyro is complicated and the entire apparatus is large-scale and, therefore, the application thereof to popular cameras, or the like, excepting cameras for very limited special uses, has been difficult.

SUMMARY OF THE INVENTION

It is an object of the present invention to provide a blur detecting apparatus which can be made compact and light in weight and can be contained, for example, in a compact, light-weight camera and, moreover requires consumption of a small amount of electric power.

To achieve the above object, the present invention provides a blur detecting apparatus which is provided with light projecting means for projecting a signal light, light receiving means for receiving the signal light projected from said light projecting means and detecting the received position of said signal light, guide means for guiding the signal light projected from said light projecting means to said light receiving means, and varying means for varying the guiding action of said guide means in conformity with blur and varying the received position of said signal light received by said light receiving means and in which the blur state is detected from the received position of said signal light detected by said light receiving means.

Other objects of the present invention will become apparent from the following detailed description of some specific embodiments thereof taken in conjunction with the accompanying drawings.

DETAILED DESCRIPTION OF THE PREFERRED EMBODIMENTS

Figure 1:
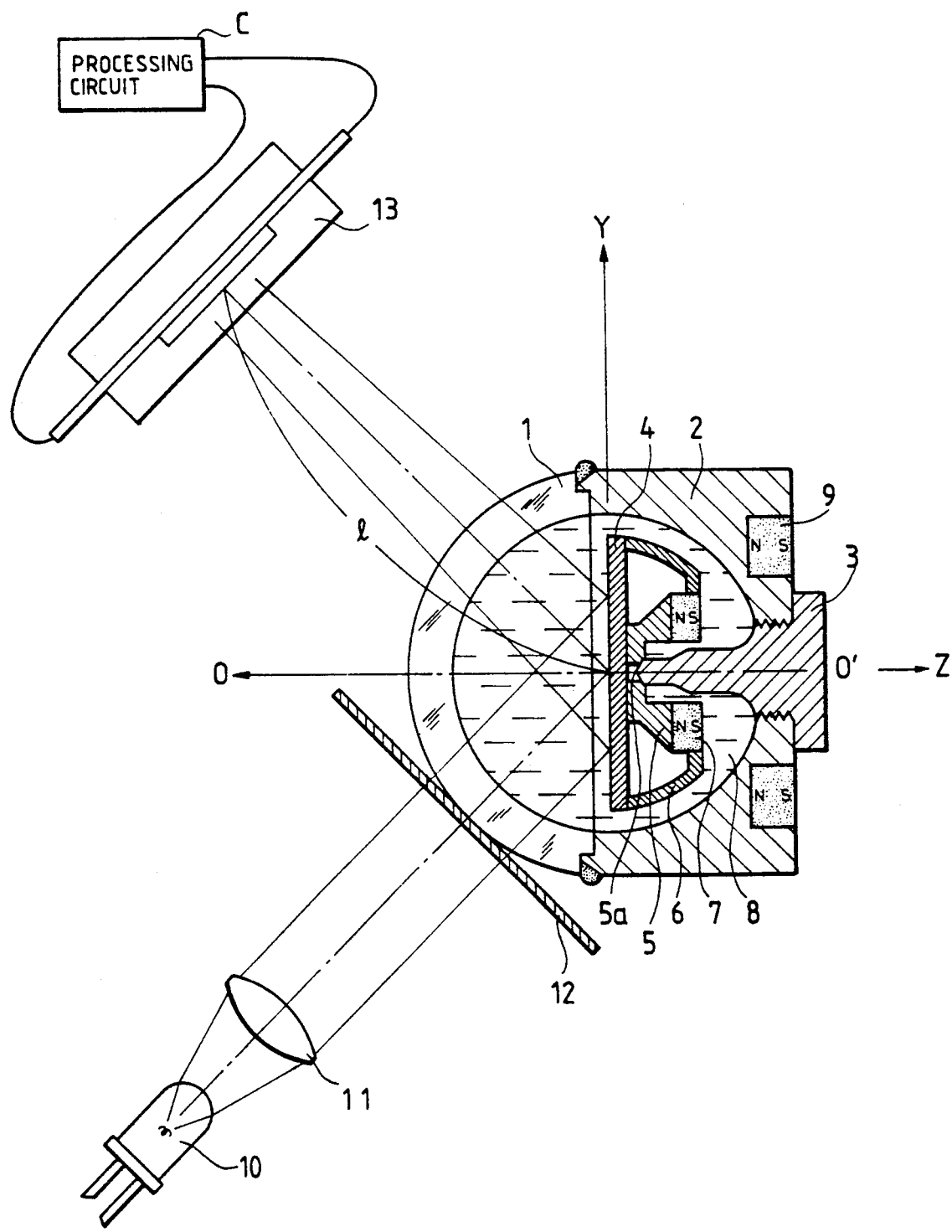
FIG. 1 is a transverse cross-sectional view showing an embodiment of a blur detecting apparatus according to the present invention.

The present invention will hereinafter be described in detail with respect to some embodiments thereof shown in the drawings.

FIG. 1 is a transverse cross-sectional view of an embodiment of a blur detecting sensor as a blur detecting device according to the present invention. The reference characters 00' designates a reference axis parallel to the photo-taking optic axis when the blur detecting sensor of the present embodiment is mounted, for example, on a camera. The reference numeral 1 denotes a semispherical shell-like lens made of a transparent material such as glass, and the reference numeral 2 designates a housing having its inner side formed into a semispherical concave shape and fixed to a sensor unit bed, not shown. The lens 1 and the housing 2 are adhesively secured to each other to form a liquid-tight container. The reference numeral 3 denotes a pivot shaft inserted from the bottom side of the housing 2, and the base side thereof is screw-coupled to the housing 2 to thereby provide a hermetically sealed structure. The reference numeral 4 designates a disk-like mirror as guide means for reflecting and guiding a signal light which will be described later, the reference numeral 5 denotes a cylindrically-shaped mirror holder adhesively secured to the center of the back of the mirror 4, the reference numeral 6 designates a substantially semispherical mirror case having open front and rear portions, and the reference numeral 7 denotes a circular ring-like mirror magnet adhesively secured to the back side of the mirror holder 5. As shown, the mirror case 6 is adhesively secured to the mirror 4 and the mirror magnet 7 to thereby constitute a mirror unit having a cavity portion formed in the mirror case 6, and the tip end portion of the pivot shaft 3 as variable means is engaged with the engagement hole 5a of the mirror holder 5, whereby the mirror unit is pivotably supported. The reference numeral 8 designates transparent liquid of a great specific gravity and relatively low viscosity, which may suitably be, for example, Florinart FC-75 produced by 3M Inc., U.S.A.

What is important here is to cause the mirror unit in the transparent liquid 8 to be substantially balanced in gravity and buoyancy and keep a stationary condition in its shown position.

The reference numeral 9 denotes a housing magnet secured to the housing 2. The housing magnet 9 and the mirror magnet 7 attract each other so as to cause the mirror unit to be stably held on the pivot shaft 3. The reference numeral 10 designates a light source such as an infrared light emitting LED as light projecting means for projecting a signal light, the reference numeral 11 denotes a condensing lens, the reference numeral 13 denotes a light receiving sensor such as a two-dimensional position sensing device (PSD) as light receiving means for receiving the signal grasps the light reception displacement of a light beam in two dimensions. The light source 10, the condensing lens 11, the mask 12 and the light receiving sensor 13, like the housing 2, are fixed to the sensor unit bed, not shown, and are made integral with the housing 2.

The operation of the present embodiment will now be described. First, in a state in which a camera, or the like, incorporating the blur detecting sensor of the present embodiment therein is placed quietly, the mirror unit is balanced with the transparent liquid 8 as shown in FIG. 1, and the mirror magnet 7 and the housing magnet 9 attract each other, and the reflecting surface of the mirror 4 keeps a right angle with the reference axis 00' (this position will hereinafter be referred to as the reference position).

Let it be assumed that in FIG. 1, the direction of the reference axis 00' is the Z-axis, the direction perpendicular to the plane of the drawing sheet is the X-axis, the direction orthogonal to the X-axis and the Z-axis is the Y-axis, and within a very short time $\Delta t$, there occurs a camera-shake of $\Delta\theta$ about the X-axis, that is, the entire blur detecting sensor rotates by $\Delta\theta$. The mirror unit hardly moves due to its own inertia force and the inertia force of the transparent liquid 8 and remains stationary in the shown position and thus, as a result, the mirror unit has rotated by $-\Delta\theta$ about the X-axis relative to the entire sensor.

Here, by the mirror 4 having rotated by $-\Delta\theta$, the light beam as the signal light projected from the light source 10 is reflected by the mirror 4 and is directed onto the sensor 13 while being deflected by $-2\cdot\Delta\theta$. If the distance between the mirror 4 and the sensor 13 is l, said light beam moves on the sensor 13 by l·tan $(2\cdot\Delta\theta)$ from the reference position and therefore, if the sensor 13 is a PSD, it is possible to derive an electrical signal corresponding to the amount of movement of the light beam, by means of a conventional processing circuit C. Thus, the blur of the photo-taking picture plane can be corrected by driving an actuator such as a conventional variable vertical angle prism so as to displace the photo-taking optic axis by $-\Delta\theta$ by the derived electrical signal. Thereafter, by the interaction of the mirror magnet 7 and the housing magnet 9, the mirror 4 is slowly moved so as to become perpendicular to the reference axis 00'.

Also, where the camera-shake is a rotational shake about the Y-axis, the reflected light beam from the mirror 4 likewise moves in the direction of the X-axis, and if the sensor 13 is a two-dimensional PSD, the camera-shake can likewise be converted into an electrical signal.

Accordingly, the shake of a camera, or the like is generally due chiefly to the rotations about two axes perpendicular to the photo-taking optic axis, i.e., the X-axis and the Y-axis shown, except for a special case such as close-up photography, and therefore, 90% or more of camera-shake can be prevented by providing a countermeasure for these.

Now, the actual camera-shake of a camera is such that the rotation about the X-axis and about the Y-axis takes place continuously and the frequency band thereof is of the order of less than 1 Hz to 20 Hz. In the sensor unit of the present embodiment, the higher frequency side of the shake can be detected without any problem, but if an attempt is made to detect the lower frequency side of the shake, the responsiveness becomes poor, and this leads to the possibility of a problem arising when the direction of the camera is changed. Also, the degree of necessity of detecting the shake of a low frequency differs depending on the specification of the camera. For example, in a video camera, the shutter time is 1/60 and the sway of the picture plane during reproduction may be below a certain degree and therefore, the sensor can detect a band above 2-3 Hz, and the time required until stability is attained may be short. However, in a still camera it is desired to effect shake prevention, for example, up to an exposure time of the order of $\frac{1}{8}$ second, even a shake of the order of 0.5 Hz must be detected, and when such a sensor is supposed, a time of about 10 seconds is required until stability is attained. Therefore, the displacement sensor for shake must be properly used depending on the purpose. According to the present embodiment, by changing the viscosity of the transparent liquid 8 and the intensity of the magnetic force of the mirror magnet 7 or the housing magnet 9, it is possible to change the reduction limit of the frequency of shake detection easily and a countermeasure meeting the need is possible.

Figure 2:
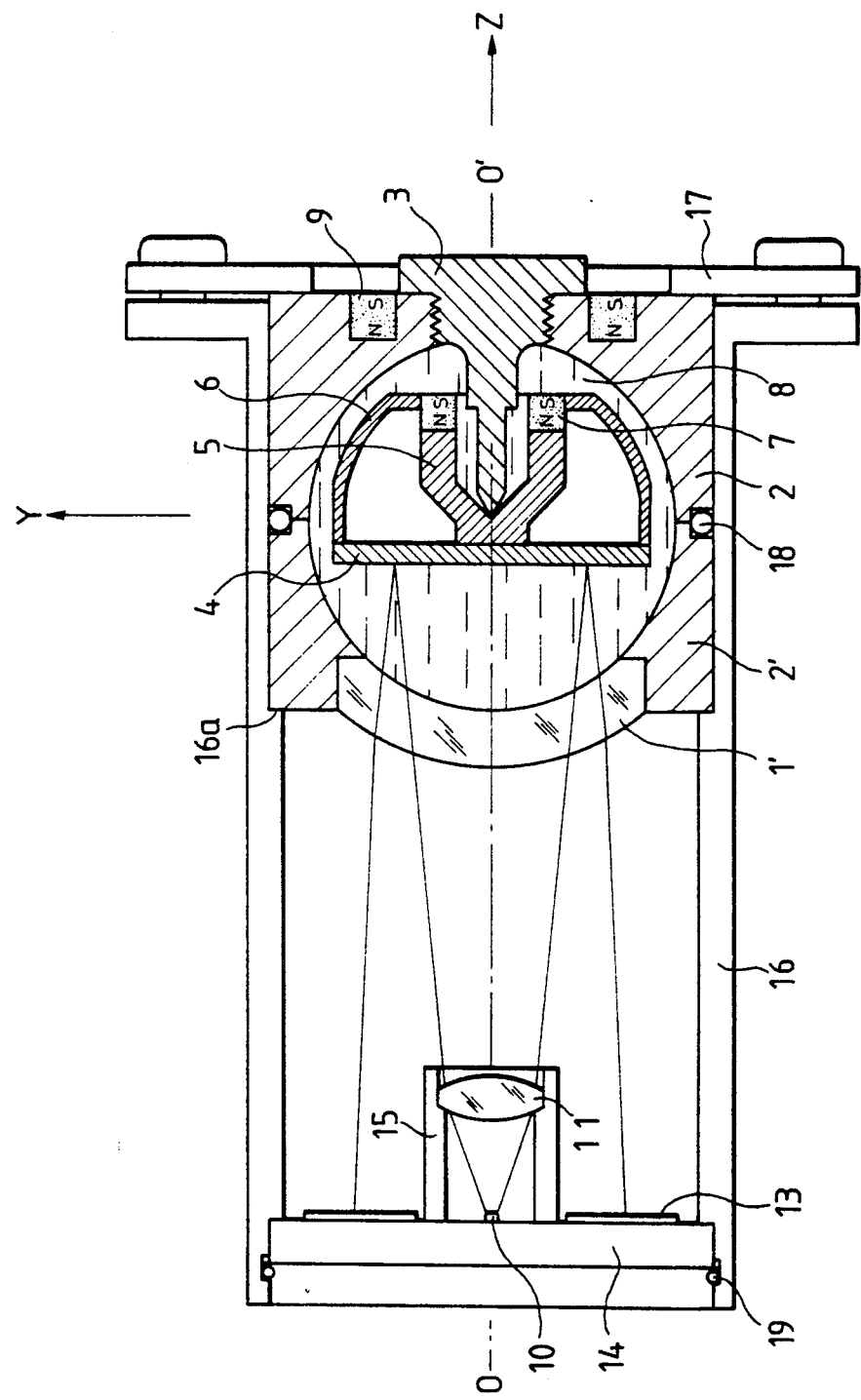
FIG. 2 is a transverse cross-sectional view showing another embodiment.

FIG. 2 is a transverse cross-sectional view of another embodiment of the present invention.

In FIG. 2, the reference numeral 1' designates a meniscus lens formed of a transparent material such as glass and adhesively secured to a lens holder 2' having the inner side thereof formed concavely into a semi-spherical shape. The lens holder 2' is inserted until it bears against one stepped portion 16a of a cylindrically-shaped sensor unit case 16, and a housing 2 bears against the lens holder 2' with an O-ring 18 interposed therebetween, and a case lid 17 is screw-fixed to the case 16, whereby the housing 2 is urged against the lens holder 2'.

Figure 3:
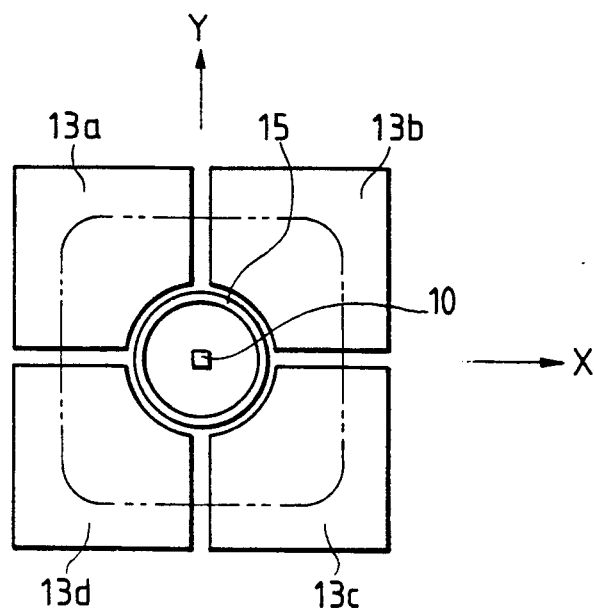
FIG. 3 is a plan view of the light receiving sensor portion of FIG. 2.

The reference numeral 14 denotes a base plate fixed to the other end of the case 16 with a cut-away ring spring 19 interposed therebetween, and a light emitting element 10 is fixed onto the line of the reference axis 00' and a lens barrel 15 having a condensing lens 11 therein is fixed so as to surround the light emitting element 10, and light receiving sensors 13a, 13b, 13c and 13d, comprising independent SPD's, each divided into four segments, as shown in FIG. 3, are mounted around the lens barrel 15. The reflected light from the light emitting element 10 reflected by a mirror 4 is received by the light receiving sensors 13a, 13b, 13c and 13d.

The operation of the present embodiment will now be described.

The mirror 4 is rotated by the shake of the camera, and the light beam moves as in the embodiment shown in FIG. 1.

In the steady state, the reflected image of a light source 10 is formed in the range of a dot-and-dash line in FIG. 3, and the outputs of the light receiving sensors 13a–13d are balanced with one another. When the signal output of the light receiving sensor 13a is A and the signal output of the light receiving sensor 13b is B and the signal output of the light receiving sensor 13c is C and the output signal of the light receiving sensor 13d is D, the displacement output of the shake about the X-axis is obtained as $A+B-(C+D)$ and the displacement output of the shake about the X-axis is obtained as $B+C-(A+D)$, and as in the embodiment of FIG. 1 using a PSD as the sensor, the shake of the camera can be detected and prevention of the camera-shake can be achieved. An example of a circuit for calculating said displacement outputs $A+B-(C+D)$ and $B+C-(A+D)$ is shown here.

Figure 4:
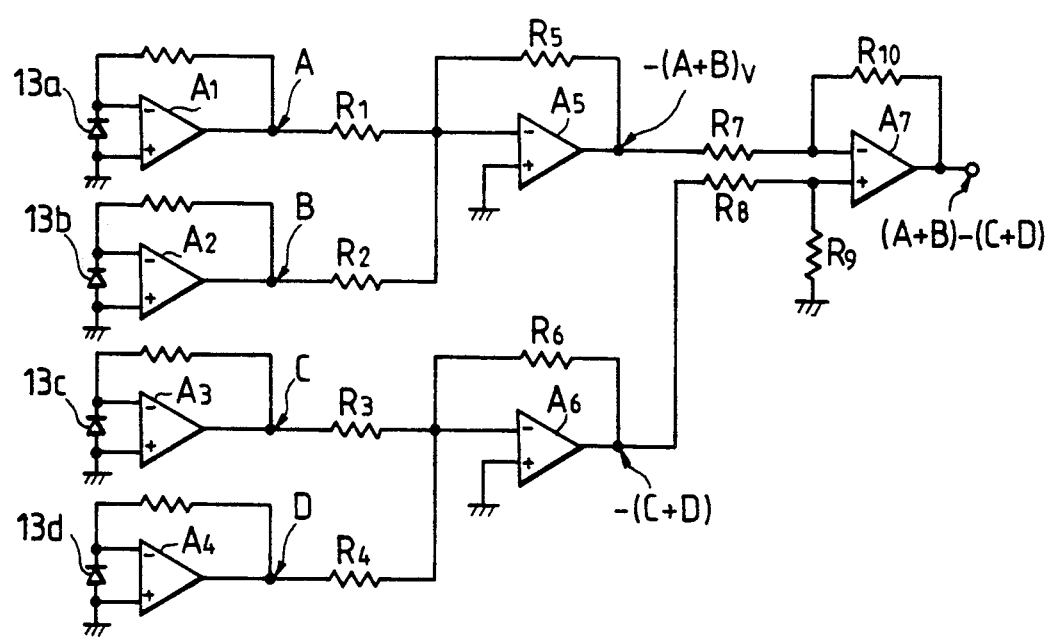
FIG. 4 is a circuit diagram showing an example of the circuit construction for calculating the light-received position from the output of the light receiving sensor of FIG. 2.

FIG. 4 shows an example of a circuit for calculating the displacement output $A+B-(C+D)$ of the shake about the X-axis. The outputs of the light receiving sensors 13a–13d are amplified by operational amplifiers A1–A4, respectively, and converted into voltages, and when these outputs are the signal outputs A–D of the light receiving sensors 13a–13d, the outputs A and B of the operational amplfiers A1 and A2 are input to the inverting input end of an operational amplifier A5 through resistors R1 and R2, and since the non-inverting input end of the operational amplifier A5 is grounded, the output of the operational amplifier A5 is $-(A+B)$ if the resistance values of resistors R1, R2 and R5 are set to R1=R2=R5.

Likewise, the outputs C and D of operational amplifiers A3 and A4 are input to the inverting input end of an operational amplifier A6 through resistors R3 and R4, and since the non-inverting input end of the operational amplifier A6 is grounded, the output of the operational amplifier A6 is −(C+D) if the resistance values of resistors R3, R4 and R6 are set to R3=R4=R6.

The outputs of the operational amplifiers A5 and A6 are input to the inverting input end and the non-inverting input end, respectively, of an operational amplifier A7 through resistors R7 and R8, and if the resistance values of resistors R7–R10 are set to R7=R8=R9=R10, said displacement output A+B−(C+D) about the X-axis is obtained as the output of the operational amplifier A7.

On the other hand, the displacement output B+C−(A+D) about the Y-axis is likewise obtained by replacing the light receiving sensors 13a and 13c of the circuit of FIG. 4 with each other.

As described above, in the first and second embodiments, detection of the shake is possible only by a circuit of LED's, PSD's, or the like, as sensors without the use of a rotational member or a vibration member which requires great energy, and the consumed electric power is very small and thus, the present is invention is fit for a compact and light-weight camera. Also, the rotational shake about the X-axis and about the Y-axis is detectable by a photodetector means and the present invention is highly effective.

In the above-described embodiments, liquid is enclosed in the housing, but in the present invention, gas, vacuum or the like may be used instead of liquid if the mirror can be properly supported therein.

Also, in the present invention, the mirror 4 may be replaced by any other suitable means which can change the optical path.

Further, in the above-described embodiments, the mirror 4 is movable relative to the sensor unit bed and the light projecting and receiving portions 10 and 13 are fixed to the sensor unit bed, but in the present invention, vice versa and further, only the light projecting portion 10 or the light receiving portion 13 may be movable and in short, any mode may be adopted if the light receiving position of the light receiving sensor 10 is variable in response to shake.

Further, in the present invention, other signal means such as an electric wave or a sound wave may of course be used instead of the signal light in the above-described embodiments.

What is claimed is:

1. A blur detecting apparatus comprising:
   (A) light projecting means for projecting a signal light;
   (B) light receiving means for receiving the signal light projected from said light projecting means and detecting the received position of said signal light, a blur state being detected in conformity with the received position of said signal light received by said light receiving means;
   (C) guide means for guiding the signal light projected from said light projecting means to said light receiving means; and
   (D) varying means for varying the light receiving position of said light receiving means receiving said light signal by changing a relative positional relationship between said guide means and at least either said light projecting means or said light receiving means, said varying means including a liquid which controls the relative positional relationship so as to correspond with the blur state by restricting a following movement of the varying means in response to the blur state.

2. An apparatus according to claim 1, wherein said light receiving means includes a received position detecting element.

3. An apparatus according to claim 2, wherein said received position detecting element includes a two-dimensional PSD.

4. An apparatus according to claim 1, wherein said guide means includes optical path forming means for forming the optical path of the signal light.

5. An apparatus according to claim 4, wherein said varying means includes movable means for varying the direction of said optical path forming means relative to said light projecting means of said light receiving means in conformity with blur.

6. An apparatus according to claim 5, wherein said movable means includes support means for displaceably supporting said optical path forming means in such a manner that said optical path forming means varies a direction of an optical path formed by said optical path forming means.

7. An apparatus according to claim 1, wherein said guide means includes reflecting means for reflecting said signal light.

8. An apparatus according to claim 7, wherein said varying means includes movable means for varying the direction of said reflecting means relative to said light projecting means or said light receiving means in conformity with blur.

9. An apparatus according to claim 8, wherein said movable means includes support means for displaceably supporting said reflecting means in such a manner that said reflecting means varies a direction of an optical path formed by said optical path forming means.

10. An apparatus according to claim 5, further including means for hermetically sealing said liquid, wherein said movable means is located in said liquid.

11. An apparatus according to claim 10, wherein said liquid is a transparent liquid.

12. An apparatus according to claim 10, wherein said liquid includes liquid of great specific gravity and relatively low viscosity.

13. An apparatus according to claim 8, further including means for hermetically sealing said liquid, wherein said movable means is located in said liquid.

14. An apparatus according to claim 13, wherein said liquid includes transparent liquid.

15. An apparatus according to claim 13, wherein said liquid includes liquid of great specific gravity and relatively low viscosity.

16. An apparatus according to claim 1, wherein said light receiving means includes means for two-dimensionally detecting the received position of the signal light.

17. A blur detecting apparatus comprising:
   (A) light projecting means for projecting a signal light;
   (B) light receiving means for receiving the signal light projected from said light projecting means and detecting the received position of said signal light, a blur state being detected in conformity with the received position of said signal light received by said light receiving means;
   (C) guide means for guiding the signal light projected from said light projecting means to said light receiving means; and
   (D) varying means for varying the light receiving position of said light receiving means receiving said light signal by changing a relative positional relationship between said guide means and at least either said light projecting means or said light receiving means; and (E) setting means for setting the relative positional relationship to a predetermined positional relationship.

18. An apparatus according to claim 17, wherein said light receiving means includes a received position detecting element.

19. An apparatus according to claim 18, wherein said received position detecting element includes a two-dimensional PSD.

20. An apparatus according to claim 17, wherein said guide means includes optical path forming means for forming the optical path of the signal light.

21. An apparatus according to claim 20, wherein said varying means includes movable means for varying the direction of said optical path forming means relative to said light projecting means or said light receiving means in conformity with blur.

22. An apparatus according to claim 21, wherein said movable means includes support means for displaceably supporting said optical path forming means in such a manner that said optical path forming means varies a direction for an optical path formed by said optical path forming means.

23. An apparatus according to claim 17, wherein said guide means includes reflecting means for reflecting the signal light.

24. An apparatus according to claim 23, wherein said varying means includes movable means for varying the direction of said reflecting means relative to said light projecting means or said light receiving means in conformity with blur.

25. An apparatus according to claim 24, wherein said movable means includes support means for displaceably supporting said reflecting means in such a manner that said reflecting means varies a direction for an optical path formed by said optical path forming means.

26. An apparatus according to claim 21, further including liquid for assisting the action of said movable means, said liquid being hermetically sealed, said movable means being in said liquid.

27. An apparatus according to claim 26, wherein said liquid is a transparent liquid.

28. An apparatus according to claim 26, wherein said liquid includes liquid of great specific gravity and relatively low viscosity.

29. An apparatus according to claim 24, further including liquid for assisting the action of said movable means, said liquid being hermetically sealed, said movable means being in said liquid.

30. An apparatus according to claim 29, wherein said liquid includes transparent liquid.

31. An apparatus according to claim 29, wherein said liquid includes liquid of great specific gravity and relatively low viscosity.

32. An apparatus according to claim 17, wherein said light receiving means includes means for two-dimensionally detecting the received position of the signal light.

33. A blur detecting apparatus comprising:
(A) projecting means for projecting a signal;
(B) receiving means for receiving the signal projected from said projecting means and detecting the received position of said signal, a blur state being detected in conformity with the received position of said signal received by said receiving means;
(C) guide means for guiding the signal projected from said projecting means to said receiving means; and
(D) varying means for varying the receiving position of said receiving means receiving said signal by changing a relative positional relationship between said guide means and at least either said projecting means or said receiving means, said varying means including a liquid which controls the relative positional relationship so as to correspond with the blur state by restricting a following movement of the varying means in response to the blur state.

34. A blur detecting apparatus comprising:
(A) projecting means for projecting a signal;
(B) receiving means for receiving the signal projected from said projecting means and detecting the received position of said signal, a blur state being detected in conformity with the received position of said signal received by said receiving means;
(C) guide means for guiding the signal projected from said projecting means to said receiving means;
(D) varying means for varying the receiving position of said receiving means receiving said signal by changing a relative positional relationship between said guide means and at least either said projecting means or said receiving means; and
(E) setting means for setting said relative positional relationship to a predetermined positional relationship.

35. A camera provided with a blur detecting apparatus, comprising:
(A) light projecting means for projecting a signal light;
(B) light receiving means for receiving the signal light projected from said light projecting means and detecting the received position of said signal light, a blur state being detected in conformity with the received position of said signal light received by said light receiving means;
(C) guide means for guiding the signal light projected from said light projecting means to said light receiving means; and
(D) varying means for varying the light receiving position of said light receiving means receiving said light signal by changing a relative positional relationship between said guide means and at least either said light projecting means or said light receiving means, said varying means including a liquid which controls the relative positional relationship so as to correspond with the blur state by restricting a following movement of the varying means in response to the blur state.

36. A camera according to claim 35, wherein said light receiving means includes a received position detecting element.

37. A camera according to claim 36, wherein said received position detecting element includes a two-dimensional PSD.

38. A camera according to claim 35, wherein said guide means includes optical path forming means for forming the optical path of the signal light.

39. A camera according to claim 38, wherein said varying means includes movable means for varying the direction of said optical path forming means relative to said light projecting means or said light receiving means in conformity with blur.

40. A camera according to claim 39, wherein said movable means includes support means for displaceably supporting said optical path forming means in such a manner that said optical path forming means varies a direction of an optical path formed by said optical path forming means.

41. A camera according to claim 35, wherein said guide means includes reflecting means for reflecting the signal light.

42. A camera according to claim 41, wherein said varying means includes movable means for varying the direction of said reflecting means relative to said light projecting means or said light receiving means in conformity with blur.

43. A camera according to claim 42, wherein said movable means includes support means for displaceably supporting said reflecting means in such a manner that said reflecting means varies a direction of an optical path formed by said optical path forming means.

44. A camera according to claim 39, further including means for hermetically sealing said liquid, wherein said movable means is located in said liquid.

45. A camera according to claim 44, wherein said liquid a transparent liquid.

46. A camera according to claim 44, wherein said liquid includes liquid of great specific gravity and relatively low viscosity.

47. A camera according to claim 42, further including means for hermetically sealing said liquid, wherein said movable means is located in said liquid.

48. A camera according to claim 47, wherein said liquid includes transparent liquid.

49. A camera according to claim 47, wherein said liquid includes liquid of great specific gravity and relatively low viscosity.

50. A camera according to claim 35, wherein said light receiving means includes means for two-dimensionally detecting the received position of said signal light.

51. A camera provided with a blur detecting apparatus, comprising:
   (A) light projecting means for projecting a signal light;
   (B) light receiving means for receiving the signal light projected from said light projecting means and detecting the received position of said signal light, a blur state being detected in conformity with the received position of said signal light received by said light receiving means;
   (C) guide means for guiding the signal light projected from said light projecting means to said light receiving means;
   (D) varying means for varying the light receiving position of said light receiving means receiving said light signal by changing a relative positional relationship between said guide means and said light projecting means or said light receiving means; and
   (E) setting means for setting said relative positional relationship to a predetermined positional relationship.

52. A camera according to claim 51, wherein said light receiving means includes a received position detecting element.

53. A camera according to claim 52, wherein said received position detecting element includes a two-dimensional PSD.

54. A camera according to claim 51, wherein said guide means includes optical path forming means for forming the optical path of the signal light.

55. A camera according to claim 54, wherein said varying means includes movable means for varying the direction of said optical path forming means relative to said light projecting means or said light receiving means in conformity with blur.

56. A camera according to claim 55, wherein said movable means includes support means for displaceably supporting said optical path forming means in such a manner that said optical path forming means varies the direction.

57. A camera according to claim 51, wherein said guide means includes reflecting means for reflecting the signal light.

58. A camera according to claim 57, wherein said varying means includes movable means for varying the direction of said reflecting means relative to said light projecting means or said light receiving means in conformity with blur.

59. A camera according to claim 58, wherein said movable means includes support for displaceably supporting said reflecting means in such a manner that said reflecting means varies a direction of an optical path formed by said optical path forming means.

60. A camera according to claim 55, further including means for hermetically sealing said liquid, wherein said movable means is located in said liquid.

61. A camera according to claim 60, wherein said liquid is a transparent liquid.

62. A camera according to claim 60, wherein said liquid includes liquid of great specific gravity and relatively low viscosity.

63. A camera according to claim 58, further including means for hermetically sealing said liquid, wherein said movable means is located in said liquid.

64. A camera according to claim 63, wherein said liquid includes transparent liquid.

65. A camera according to claim 63, wherein said liquid includes liquid of great specific gravity and relatively low viscosity.

66. A camera according to claim 51, wherein said light receiving means includes means for two-dimensionally detecting the received position of the signal light.

67. In a camera provided with a blur detecting apparatus, comprising:
   (A) projecting means for projecting a signal;
   (B) receiving means for receiving the signal projected from said projecting means and detecting the received position of said signal, a blur state being detected in conformity with the received position of said signal received by said receiving means;
   (C) guide means for guiding the signal projected from said projecting means to said receiving means; and
   (D) varying means for varying the receiving position of said receiving means receiving said signal by changing a relative positional relationship between said guide means and at least either said projecting means or said receiving means, said varying means including a liquid which controls the relative positional relationship so as to correspond with the blur state by restricting a following movement of the varying means in response to the blur state.

68. In a camera provided with a blur detecting apparatus, comprising:
   (A) projecting means for projecting a signal;
   (B) receiving means for receiving the signal projected from said projecting means and detecting the received position of said signal, a blur state being detected in conformity with the received position of said signal received by said receiving means;

(C) guide means for guiding the signal projected from said projecting means to said receiving means;

(D) varying means for varying the receiving position of said receiving means receiving said signal by changing a relative positional relationship between said guide means and said projecting means or said receiving means; and (E) setting means for setting said relative positional relationship to a predetermined positional relationship.

69. A blur detecting apparatus, comprising:
(a) projecting means for projecting a signal;
(b) receiving means for receiving the signal projected from said projecting means, said receiving means detecting a blur state in accordance with received condition of the signal; and
(c) varying means for varying the signal received condition of said receiving means in response to the blur state by an operation of a liquid restricting at least a part of a relative positional relationship among said projecting means, said receiving means, and a signal path between them.

70. An apparatus according to claim 69, wherein said projecting means includes means for projecting a signal light as the signal.

71. An apparatus according to claim 69, wherein said receiving means includes means for detecting a receiving position of the signal projected from said projecting means.

72. An apparatus according to claim 69, wherein said varying means includes guide means for guiding the signal projected from said projecting means to said receiving means, said guide means being operated by said liquid.

73. An apparatus according to claim 72, wherein said guide means is located in said liquid.

74. An apparatus according to claim 73, wherein said liquid is a transparent liquid.

75. An apparatus according to claim 73, wherein said liquid includes liquid of great specific gravity and relatively low viscosity.

76. An apparatus according to claim 69, wherein said liquid includes liquid of great specific gravity and relatively low viscosity.

77. An apparatus according to claim 69, wherein said varying means includes guide means for guiding the signal projected from said projecting means to said receiving means, a relative positional relationship between said guide means and at least either said projecting means or said receiving means changing in response to the blur state.

78. An apparatus according to claim 77, wherein said guide means includes a movable member.

79. An apparatus according to claim 77, wherein said guide means includes means for reflecting said signal.

80. An apparatus according to claim 72, wherein said guide means includes a movable member.

81. An apparatus according to claim 73, wherein said guide means includes means for reflecting said signal.

82. A blur detecting apparatus, comprising:
(a) projecting means for projecting a signal;
(b) receiving means for receiving the signal projected from said projecting means, said receiving means detecting a blur state in accordance with received condition of the signal;
(c) varying means for varying the signal received condition of said receiving means in response to the blur state by varying at least a part of a relative positional relationship among said projecting means, receiving means and a signal path between them; and
(d) setting means for setting the relative positional relationship to a predetermined positional relationship.

83. An apparatus according to claim 82, wherein said projecting means includes means for projecting a signal light as the signal.

84. An apparatus according to claim 82, wherein said receiving means includes means for detecting a receiving position of the signal projected from said projecting means.

85. An apparatus according to claim 82, wherein said varying means includes a liquid restricting at least a part of a relative positional relationship among said projecting means, receiving means and a signal path between them.

86. An apparatus according to claim 85, wherein said varying means includes guide means for guiding the signal projected from said projecting means to said receiving means, said guide means being operated by said liquid.

87. An apparatus according to claim 86, wherein said guide means is located in said liquid.

88. An apparatus according to claim 87, wherein said liquid is a transparent liquid.

89. An apparatus according to claim 87, wherein said liquid includes liquid of great specific gravity and relatively low viscosity.

90. An apparatus according to claim 85, wherein said liquid includes liquid of great specific gravity and relatively low viscosity.

91. An apparatus according to claim 85, wherein said varying means includes guide means for guiding the signal projected from said projecting means to said receiving means, a relative positional relationship between said guide means and at least either said projecting means or said receiving means changing in response to the blur state.

92. An apparatus according to claim 91, wherein said guide means includes a movable member.

93. An apparatus according to claim 91, wherein said guide means includes means for reflecting said signal.

94. An apparatus according to claim 86, wherein said guide means includes a movable member.

95. An apparatus according to claim 87, wherein said guide means includes means for reflecting said signal.

96. A camera provided with a blur detecting apparatus, comprising:
(a) projecting means for projecting a signal;
(b) receiving means for receiving the signal projected from said projecting means, said receiving means detecting a blur state in accordance with received condition of the signal; and
(c) varying means for varying the signal received condition of said receiving means in response to the blur state by an operation of a liquid restricting at least a part of a relative positional relationship among said projection means, said receiving means, and a signal path between them.

97. A camera according to claim 96, wherein said projecting means includes means for projecting a signal light as the signal.

98. A camera according to claim 96, wherein said receiving means includes means for detecting a receiving position of the signal projected from said projecting means.

99. A camera according to claim 96, wherein said varying means includes guide means for guiding the signal projected from said projecting means to said receiving means, said guide means being operated by said liquid.

100. A camera according to claim 99, wherein said guide means is located in said liquid.

101. A camera according to claim 100, wherein said liquid is a transparent liquid.

102. A camera according to claim 100, wherein said liquid includes liquid of great specific gravity and relatively low viscosity.

103. A camera according to claim 96, wherein said liquid includes liquid of great specific gravity and relatively low viscosity.

104. A camera according to claim 96, wherein said varying means includes guide means for guiding the signal projected from said projecting means to said receiving means, a relative positional relationship between said guide means and at least either said projecting means or said receiving means changing in response to the blur state.

105. A camera according to claim 104, wherein said guide means includes a movable member.

106. A camera according to claim 104, wherein said guide means includes means for reflecting said signal.

107. A camera according to claim 99, wherein said guide means includes a movable member.

108. A camera according to claim 100, wherein said guide means includes means for reflecting said signal.

109. A camera provided with a blur detecting apparatus, comprising:
 (a) projecting means for projecting a signal;
 (b) receiving means for receiving the signal projected from said projecting means, said receiving means detecting a blur state in accordance with received condition of the signal;
 (c) varying means for varying the signal received condition of said receiving means in response to the blur state by varying at least a part of a relative positional relationship among said projecting means, receiving means and a signal path between them; and
 (d) setting means for setting the relative positional relationship to a predetermined positional relationship.

110. A camera according to claim 109, wherein said projecting means includes means for projecting a signal light as the signal.

111. A camera according to claim 109, wherein said receiving means includes means for detecting a receiving position of the signal projected from said projecting means.

112. A camera according to claim 109, wherein said varying means includes a liquid restricting at least a part of a relative positional relationship among said projecting means, receiving means and a signal path between them.

113. A camera according to claim 112, wherein said varying means includes guide means for guiding the signal projected from said projecting means to said receiving means, said guide means being operated by said liquid.

114. A camera according to claim 113, wherein said guide means is located in said liquid.

115. A camera according to claim 114, wherein said liquid is a transparent liquid.

116. A camera according to claim 114, wherein said liquid includes liquid of great specific gravity and relatively low viscosity.

117. A camera according to claim 112, wherein said liquid includes liquid of great specific gravity and relatively low viscosity.

118. A camera according to claim 112, wherein said varying means includes guide means for guiding the signal projected from said projecting means to said receiving means, a relative positional relationship between said guide means and at least either said projecting means or said receiving means changing in response to the blur state.

119. A camera according to claim 118, wherein said guide means includes a movable member.

120. A camera according to claim 118, wherein said guide means includes means for reflecting said signal.

121. A camera according to claim 113, wherein said guide means includes a movable member.

122. A camera according to claim 114, wherein said guide means includes means for reflecting said signal.

* * * * *

UNITED STATES PATENT AND TRADEMARK OFFICE
CERTIFICATE OF CORRECTION

PATENT NO. : 5,072,251

DATED : December 10, 1991

INVENTOR(S) : Tamura et al.

It is certified that error appears in the above-identified patent and that said Letters Patent is hereby corrected as shown below:

On the title page, under item [56] References Cited:

FOREIGN PATENT DOCUMENTS:

"0055429  12/1979  Japan" should read --0055429  5/1979  Japan--.

COLUMN 1:

Line 16, "gyro or" should read --gyro, or--.

Line 17, "in" should read --an--.

Line 29, "weight" should read --weight,--.

Line 30, "moreover" should read --moreover,--.

COLUMN 2:

Line 4, "designates" should read --designate--.

Line 51, "signal grasps" should read --signal light which grasps--.

COLUMN 3:

Line 35, "like" should read --like--.

UNITED STATES PATENT AND TRADEMARK OFFICE
CERTIFICATE OF CORRECTION

PATENT NO. : 5,072,251            Page 2 of 3

DATED : December 10, 1991

INVENTOR(S) : Tamura et al.

It is certified that error appears in the above-identified patent and that said Letters Patent is hereby corrected as shown below:

COLUMN 5:

Line 21, "is" (second occurrence) should read deleted.

Line 61, "light signal" should read --signal light--.

COLUMN 6:

Line 13, "of" should read --or--.

COLUMN 9:

Line 21, "liquid" should read --liquid is--.

COLUMN 10:

Line 18, "support" should read --support means--.

Line 42, "In a" should read --A--

Line 61, "In a" should read --A--

UNITED STATES PATENT AND TRADEMARK OFFICE
CERTIFICATE OF CORRECTION

PATENT NO. : 5,072,251

DATED : December 10, 1991

INVENTOR(S) : Tamura et al.

It is certified that error appears in the above-identified patent and that said Letters Patent is hereby corrected as shown below:

<u>COLUMN 11</u>:

Line 21, "projecting means," should read
--projection means,--.

Signed and Sealed this

Twentieth Day of July, 1993

Attest:

MICHAEL K. KIRK

Attesting Officer    Acting Commissioner of Patents and Trademarks